(12) United States Patent
Suzuki et al.

(10) Patent No.: US 12,155,333 B2
(45) Date of Patent: Nov. 26, 2024

(54) MOTOR DRIVE SYSTEM AND MOTOR DRIVE METHOD

(71) Applicant: TMEIC Corporation, Chuo-ku (JP)

(72) Inventors: Shinya Suzuki, Tokyo (JP); Shunsuke Tobayashi, Tokyo (JP)

(73) Assignee: TMEIC Corporation, Chuo-ku (JP)

( * ) Notice: Subject to any disclaimer, the term of this patent is extended or adjusted under 35 U.S.C. 154(b) by 0 days.

(21) Appl. No.: 17/995,942

(22) PCT Filed: Oct. 21, 2020

(86) PCT No.: PCT/JP2020/039536
§ 371 (c)(1),
(2) Date: Oct. 11, 2022

(87) PCT Pub. No.: WO2022/085109
PCT Pub. Date: Apr. 28, 2022

(65) Prior Publication Data
US 2023/0275534 A1 Aug. 31, 2023

(51) Int. Cl.
*H02P 27/08* (2006.01)
*H02P 6/08* (2016.01)
(52) U.S. Cl.
CPC .............. *H02P 27/085* (2013.01); *H02P 6/08* (2013.01)
(58) Field of Classification Search
CPC .... H02P 25/032; H02P 25/062; H02P 25/064; H02P 25/08; H02P 25/024; H02P 27/00;
(Continued)

(56) References Cited

FOREIGN PATENT DOCUMENTS

EP 3051691 B1 * 3/2019 ........... D06F 37/304
JP 2009-142112 A 6/2009
(Continued)

OTHER PUBLICATIONS

Junho Lee et al., Motor Driving Device and Lundry Treatment Apparatus Including the Same, Jun. 3, 2019, Clarivate Analytics, pp. 1-35. (Year: 2019).*
(Continued)

*Primary Examiner* — Antony M Paul
(74) *Attorney, Agent, or Firm* — Oblon, McClelland, Maier & Neustadt, L.L.P.

(57) ABSTRACT

A motor drive system of the embodiment includes a power converter, a state detector, a frequency calculator, a frequency correction command generator, a drive amount limiter, and a speed controller. The power converter drives a motor by PWM control. The state detector detects a drive state of the motor. The frequency calculator detects a size of a specific frequency component which fluctuates according to the drive state by using an index value indicating the drive state. The frequency correction command generator generates a correction command of a carrier frequency used for the PWM control on the basis of a detected result of periodic fluctuation of the drive state. The drive amount limiter limits a drive amount of the motor. The drive amount limiter adjusts an upper limit value of a size of a current caused to flow through windings of the motor in a direction in which the upper limit value is lowered from a predetermined upper limit current value when the carrier frequency is searched for in a direction in which the carrier frequency is increased. The speed controller generates a current reference based on a speed command value and a rotor speed of the motor according to the limitation.

5 Claims, 9 Drawing Sheets

(58) Field of Classification Search
CPC .......... H02P 27/04; H02P 27/06; H02P 27/08; H02P 27/085; H02P 29/032; H02P 29/50; H02P 6/08; H02P 6/28; H02P 21/18; H02P 21/20
See application file for complete search history.

(56) References Cited

FOREIGN PATENT DOCUMENTS

| | | |
|---|---|---|
| JP | 2014-36446 A | 2/2014 |
| JP | 2015-91186 A | 5/2015 |
| JP | 2019-68666 A | 4/2019 |

OTHER PUBLICATIONS

International Search Report issued Jan. 12, 2021 in PCT/JP2020/039536 filed on Oct. 21, 2020, 4 pages (with English Translation).

* cited by examiner

MOTOR DRIVE SYSTEM AND MOTOR DRIVE METHOD

TECHNICAL FIELD

Embodiments of the present invention relate to a motor drive system and a motor drive method.

BACKGROUND ART

In a motor drive system that drives a motor by combining a power converter and a motor (rotary electric machine), unnecessary noise and vibration may be generated from the motor due to a relationship between a control state of the power converter and an intrinsic frequency of the motor. It is desired that such vibration do not occur in a motor drive system. After a motor drive system is installed, mechanical or electrical adjustment may be performed so that the above-described vibration does not occur in the motor, but it may not be able to be performed easily.

CITATION LIST

Patent Literature

Patent Literature 1

Japanese Unexamined Patent Application, First Publication No. 2019-68666

SUMMARY OF INVENTION

Technical Problem

An objective of the present invention is to provide a motor drive system and a motor drive method in which generation of noise or vibration caused by driving a motor is suppressed.

Solution to Problem

A motor drive system of an embodiment includes a power converter, a state detector, a frequency calculator, a frequency correction command generator, a drive amount limiter, and a speed controller. The power converter drives a motor by PWM control. The state detector detects a drive state of the motor. The frequency calculator detects a size of a specific frequency component which fluctuates according to the drive state by using an index value indicating the drive state. The frequency correction command generator generates a correction command of a carrier frequency used for the PWM control on the basis of a detected result of periodic fluctuation of the drive state. The drive amount limiter limits a drive amount of the motor. The drive amount limiter adjusts an upper limit value of a size of a current caused to flow through windings of the motor in a direction in which the upper limit value is lowered from a predetermined upper limit current value when the carrier frequency is searched for in a direction in which the carrier frequency is increased. The speed controller generates a current reference based on a speed command value and a rotor speed of the motor according to the limitation.

DESCRIPTION OF EMBODIMENTS

Hereinafter, a motor drive system and the motor drive method of an embodiment will be described with reference to the drawings.

Further, the drawings are schematic or conceptual, and allocation of functions of parts is not necessarily the same as the actual ones.

Further, in the specification of the present application and the drawings, components having the same or similar functions are denoted by the same reference signs. Then, duplicate description of these components may be omitted.

In the embodiment, "connected" includes being electrically connected. "Based on XX" means "based on at least XX" and may include cases of being based on other elements in addition to XX. "Based on XX" is not limited to a case in which XX is directly used and may include a case of being based on XX on which a calculation or processing has been performed. "XX or YY" is not limited to a case of either one of XX and YY, and may include a case of both the XX and YY. The same applies to a case when there are three or more optional elements. "XX" and "YY" are arbitrary elements (for example, arbitrary information). "Power converter" is a power converter that outputs an alternating current and includes, for example, an inverter, an AC/AC converter, and the like. "Motor" is a rotary electric machine driven by AC power, and a speed thereof is controlled by VVVF control or the like.

First Embodiment

Figure 1:
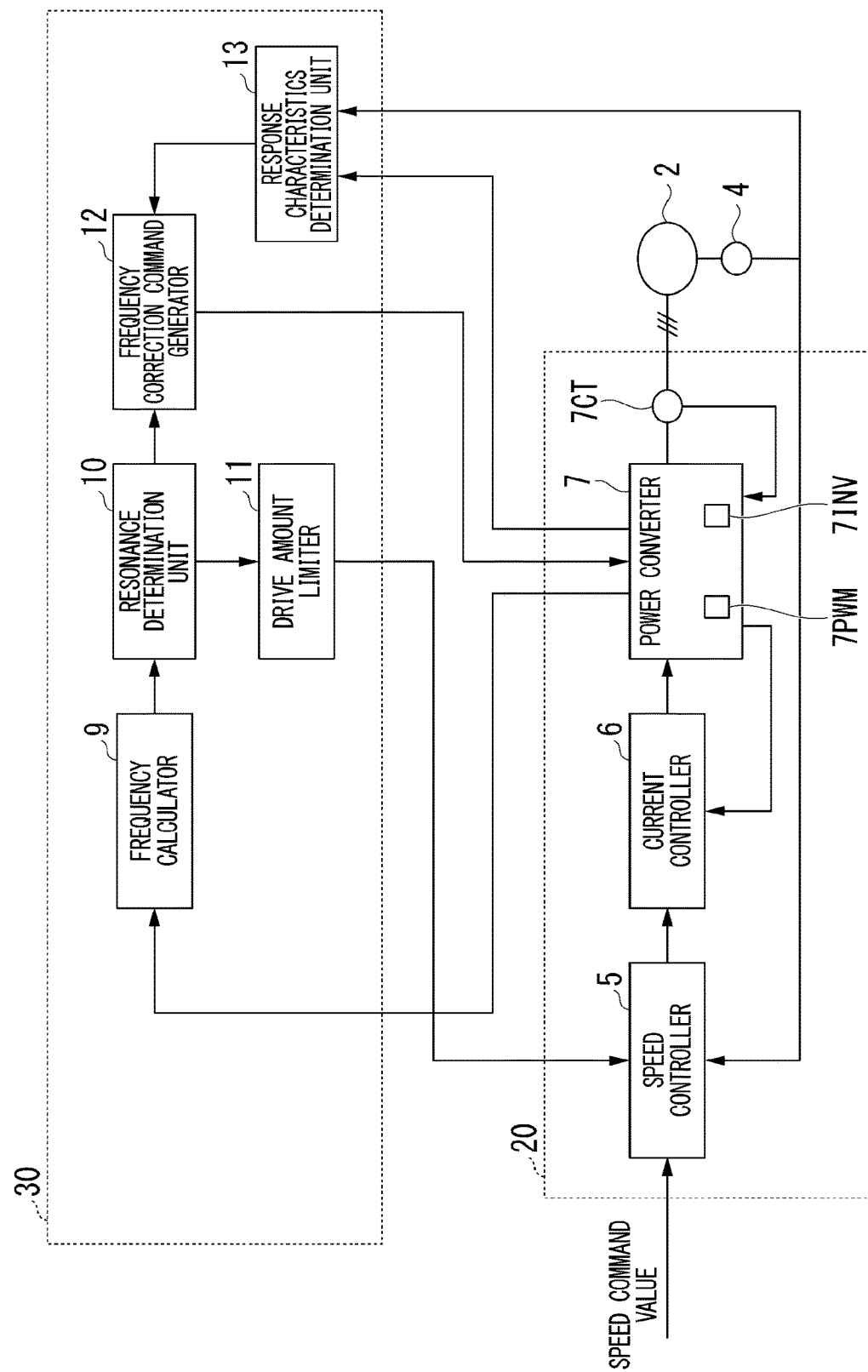
FIG. 1 is a block diagram illustrating a motor drive system according to a first embodiment.

FIG. 1 is a block diagram illustrating a motor drive system 1 according to a first embodiment.

In FIG. 1, a configuration of a motor speed control device 20 is illustrated in addition to a configuration of a vibration suppression control device 30. Further, the vibration suppression control device 30 may be housed in the same housing or board as the motor speed control device 20, or may be housed in another physically separate housing or the like. For example, the motor drive system 1 includes the motor speed control device 20 and the vibration suppression control device 30.

As illustrated in FIG. 1, the motor speed control device 20 is connected to a motor 2, a speed detector 4, and the vibration suppression control device 30. The motor speed control device 20 controls the motor 2 so that an actual speed of the motor 2 detected by the speed detector 4 coincides with a speed command value supplied separately. The motor speed control device 20 can operate to suppress vibration due to resonance of the motor 2 and a mechanical load driven by the motor 2 by setting operation parameters according to a correction value supplied from the vibration suppression control device 30. Hereinafter, the resonance generated in the motor 2 and the mechanical load driven by the motor 2 is simply referred to as resonance of the motor 2. The resonance generated in the motor 2 and the mechanical load driven by the motor 2 may include resonance of a shaft torsional vibration system via a connected shaft. Operation parameters adjusted by correction will be described later.

A rotating shaft of the motor 2 and the mechanical load are connected by a connecting shaft. A drive torque of the motor 2 is transmitted to the mechanical load via the connecting shaft. The motor speed control device 20 drives the motor 2 by variable speed control. For example, the motor 2 is a motor driven by AC power, and is an induction motor, a synchronous motor, or the like. For example, the motor speed control device 20 is an inverter device that drives an induction motor, a synchronous motor, or the like.

The motor speed control device 20 includes a speed controller 5, a current controller 6, and a power converter 7.

The speed controller 5 generates a command value of the drive torque by multiplying a speed deviation between a speed command value and a speed of the motor 2 detected by the speed detector 4 by a predetermined speed response gain. The speed command value is supplied from an upper level control device such as, for example, a programmable controller (PLC). The speed controller 5 includes a limiter that limits an output value to limit an overmodulation state of PWM control in a subsequent stage. A limit value of the limiter is an example of an operating parameter that can be adjusted by control. A more specific configuration of the speed controller 5 will be described later.

The current controller 6 is connected to an output of the speed controller 5. The current controller 6 outputs a control amount generated according to a difference between the command value of the drive torque supplied from the speed controller 5 and a torque current component supplied to the motor 2.

The power converter 7 is connected to an output of the current controller 6. For example, the power converter 7 includes a PWM controller 7PWM and a converter main body 7INV. The power converter 7 controls the converter main body 7INV by PWM control of the PWM controller 7PWM. Thereby, the power converter 7 can drive the motor by the PWM control. The power converter 7 may output a voltage and a current for driving the motor 2 according to a control amount generated by the current controller 6.

For example, a current transformer 7CT that detects phase currents of each phase is provided in a wiring connected to an output of the power converter 7. The current transformer 7CT may be provided in the wiring of at least two phases among the wiring of respective phases of a three-phase alternating current. The power converter 7 acquires an instantaneous value of a phase current detected by the current transformer 7CT and supplies detected results to the current controller 6 and the vibration suppression control device 30. The current transformer 7CT and the power converter 7 are examples of state detectors.

The vibration suppression control device 30 determines whether or not resonance is being generated in the motor 2 on the basis of data of the instantaneous value of the supplied phase current. When resonance is being generated in the motor 2, the vibration suppression control device 30 corrects a limit value of the speed controller 5 or corrects a carrier frequency of the PWM control of the power converter 7.

A configuration of the vibration suppression control device 30 will be described in detail.

The vibration suppression control device 30 includes, for example, a frequency calculator 9 (variation detector), a resonance determination unit 10, a drive amount limiter 11, a frequency correction command generator 12, and a response characteristics determination unit 13.

An input of the frequency calculator 9 is connected to the power converter 7. The frequency calculator 9 uses an index value indicating a drive state supplied from the power converter 7 to detect a size of a specific frequency component that fluctuates according to the drive state. For example, the frequency calculator 9 converts phase current data in a time domain detected by the power converter 7 into data in a frequency domain. The frequency calculator 9 is, for example, an Fast Fourier Transform (FFT) analyzer. Further, the frequency calculator 9 is not limited thereto, and may be configured to include a filter bank that detects a size of a signal component for each frequency band.

The resonance determination unit 10 is connected to an output of the frequency calculator 9. The resonance determination unit 10 determines whether or not vibration due to resonance is being generated in the motor 2 (hereinafter, also simply referred to as generating resonance) on the basis of the data in the frequency domain.

For example, the resonance determination unit 10 has a threshold value T0 on a frequency-independent phase current. The resonance determination unit 10 determines that resonance is being generated when the phase current data in the frequency domain is equal to or higher than a threshold value T0.

For example, the resonance determination unit 10 uses the carrier frequency of the power converter 7 and its harmonic component as a frequency for determination. For example, when a carrier frequency fc of the power converter 7 and an operating frequency f0 of the motor 2 are assumed, a frequency fn for determination is set to $n \times (fc \pm f0)$, $n=1, 2, 3, \ldots$ (natural number). In the resonance determination unit 10, a threshold value Tn is set in advance for each frequency fn for determination.

Further, setting of the frequency fn for determination is not limited to the above, and can be appropriately set. The frequency fn may be set so that the range is further expanded such as, for example, $n \times (fc \pm k \times f0)$ ($k>1$) with respect to $n \times (fc \pm f0)$. Also, in a case of $fc \gg f0$ or the like, the frequency fn may be set as $fn = n \times fc$.

When phase current data equal to or higher than the set threshold value Tn is detected at any of the frequencies of fn, the resonance determination unit 10 may determine that resonance is being generated by a ripple of the phase current based on the carrier frequency. When phase current data equal to or higher than the set threshold value Tn is not detected at any of the frequency fn, the resonance determination unit 10 determines that resonance due to the speed response gain has not been generated.

The drive amount limiter 11 and the frequency correction command generator 12 are connected to an output of the resonance determination unit 10.

First, the drive amount limiter 11 will be described. When the resonance determination unit 10 determines that resonance is being generated, the resonance determination unit 10 supplies a first enable signal to the drive amount limiter 11. The first enable signal is a signal for notifying the drive amount limiter 11 that resonance is being generated and activating adjustment of a limit value of the drive amount limiter 11. The drive amount limiter 11 limits a drive amount of the motor 2 by generating a new correction value for the limit value of the drive amount according to a value of the first enable signal and supplying the correction value to the speed controller 5.

More specifically, when the carrier frequency fc is searched for in a direction in which it is increased according to a predetermined rule, the drive amount limiter 11 may adjust an upper limit value of a size of a current (phase current) caused to flow through windings of the motor 2 in a direction in which the upper limit value is lowered from a predetermined upper limit current value.

It is not necessary to limit an output current of the power converter 7 from a standard value of the carrier frequency fc (referred to as standard carrier frequency fc0) to a lower limit carrier frequency. On the other hand, if the carrier frequency fc is increased from the standard value, conversion loss in the power converter 7 increases. Therefore, it is necessary to use the power converter 7 by limiting the output current. When it is assumed that the carrier frequency fc is increased from the standard value while a rated output current is being output without limiting the output current of the power converter 7, the power converter 7 may be damaged. Therefore, in the present embodiment, when an amount of the frequency adjustment at the time of increase from the standard carrier frequency fc0 to the carrier frequency fc is denoted as $\Delta fc$, an upper limit value (limit value) of the output current of the power converter 7 is generated according to a ratio ($\Delta fc/fc0$) thereof, and the upper limit value of the output current of the power converter 7 is adjusted on the basis of that. Thereby, the upper limit value of the output current of the power converter 7 can be automatically lowered.

Figure 2:
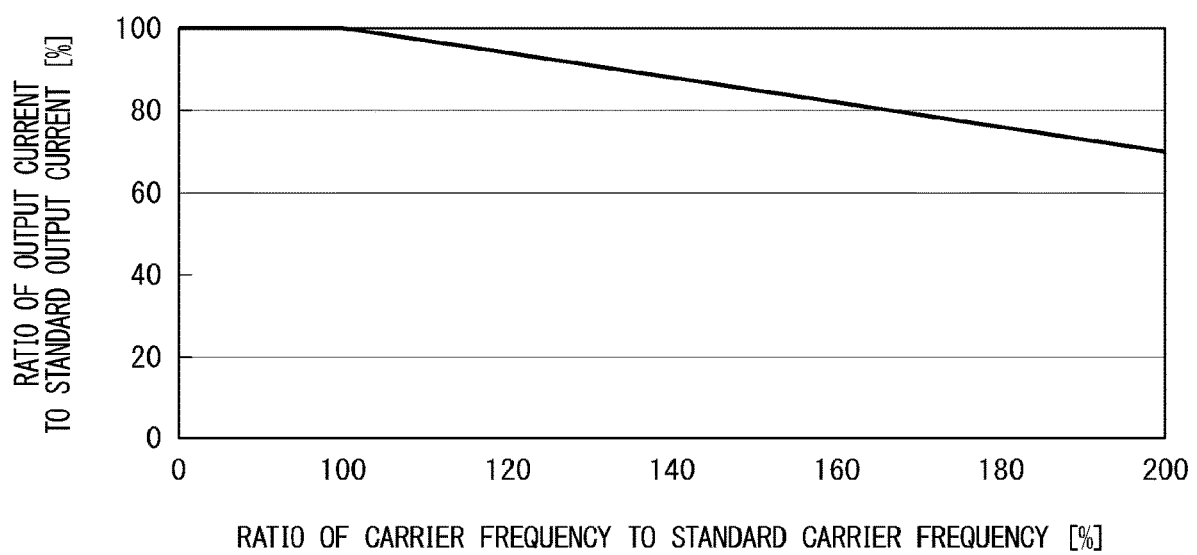
FIG. 2 is a diagram for explaining derating of an output current according to a carrier frequency of the first embodiment.

An example of derating of the output current related to this will be described with reference to FIG. 2. FIG. 2 is a diagram for explaining derating of an output current according to the carrier frequency of the first embodiment.

The graph shown in FIG. 2 shows a relationship between a ratio of the carrier frequency (fc) to the standard carrier frequency (fc0) (carrier frequency ratio:horizontal axis) and a ratio of the output current to the standard output current (output current ratio:vertical axis).

For example, the derating is set so that the output current ratio is reduced according to a magnitude of the carrier frequency ratio when the carrier frequency ratio exceeds 100% while the output current ratio in a range in which the carrier frequency ratio is 100% or less is set to 100%. When such a derating is set, it is possible to reduce loss of a semiconductor switch constituting the power converter 7 that occurs when the adjustment is made in a direction in which the carrier frequency is increased.

Returning to FIG. 1, description will be continued.

When the resonance determination unit 10 determines that resonance is being generated, the resonance determination unit 10 supplies a second enable signal to the frequency correction command generator 12. The second enable signal is a signal that activates a frequency search by the frequency correction command generator 12. The frequency correction command generator 12 that has received the second enable signal generates a new correction value of the carrier frequency and supplies it to the power converter 7.

More specifically, when the carrier frequency fc is searched for in a direction in which it is further lowered, the frequency correction command generator 12 may adjust the carrier frequency fc so that a response performance of the motor 2 falls within a range satisfying a predetermined reference.

The response characteristics determination unit 13 estimates the response performance (current response) when the motor 2 is driven and notifies the frequency correction command generator 12 of presence or absence of a change in the response performance.

For example, a speed command value, a speed of the motor 2 detected by the speed detector 4, and a detected value (instantaneous value) of the phase current may be supplied to an input of the response characteristics determination unit 13. From a transient response analysis on the basis of these, the response characteristics determination unit 13 obtains a response waveform (transient response characteristics) of the phase current with respect to a change in the speed command value. For example, a current response performance when the motor 2 is driven is estimated from a time constant indicated by the transient response characteristics of the phase current. The response characteristics determination unit 13 compares the above-described time constant with a reference value, may determine that responsiveness has not been changed and is acceptable if a deviation thereof is within a predetermined range, and may determine that responsiveness has changed and is not acceptable if a deviation thereof is outside the predetermined range. The frequency correction command generator 12 receives the determination result and can obtain a determination result as to whether or not the current response performance when the motor 2 is driven is within an acceptable range. Hereinafter, the above-described processing may be simply referred to as collecting a current response.

Next, an operation of the vibration suppression control device 30 of the present embodiment will be described.

The resonance determination unit 10 compares phase current data at all supplied frequencies with the constant threshold value T0 that is common to all frequencies. For example, when the phase current data is smaller than the threshold value T0 at all the frequencies fn, the resonance determination unit 10 determines that resonance has not been generated. The motor speed control device 20 maintains a present operation.

When the phase current data is equal to or higher than the threshold value T0, the resonance determination unit 10 compares the phase current data for each frequency fn with the threshold value Tn set for each frequency fn. The frequency fn for which the threshold value is set is set on the basis of the carrier frequency of the power converter 7. For example, the frequency fn is $n \times (fc \pm f0)$. Here, n is a natural number, fc is a carrier frequency, and f0 is an operating frequency of the motor 2.

The threshold values T1, T2, . . . are respectively set for f1, f2, . . . . The threshold values T1, T2, . . . may have values different from each other, or some or all of them may have the same value. For example, the threshold value Tn is set on the basis of a value measured by an experiment or the like or a value obtained by a simulation or the like.

When the phase current data is equal to or higher than the threshold value Tn at any of the frequency fn, the resonance determination unit 10 supplies an enable signal to the frequency correction command generator 12.

The frequency correction command generator 12 generates a correction value of the carrier frequency fc. The correction value of the carrier frequency fc is generated by, for example, acquiring a value of the carrier frequency fc from the power converter 7 and multiplying it by a coefficient α (0<α<1) that is set in advance. α is set to such as, for example, 1% (0.01). For example, the frequency correction command generator 12 calculates a new carrier frequency (1+α)×fc using the coefficient α. The calculated new carrier frequency is supplied to the power converter 7. Further, the frequency correction command generator 12 also supplies the new carrier frequency to the frequency calculator 9 and the resonance determination unit 10, and the resonance determination unit 10 updates the frequency fn for determination in conjunction with the new carrier frequency.

The power converter 7 updates the value of the carrier frequency to (1+α)×fc, and resumes or continues the operation using the updated carrier frequency.

The above-described operation is repeated until the phase current data is less than the threshold value at all frequencies n×(fc±f0).

When an upper limit of the carrier frequency that can be updated is set and if the phase current data is not less than the threshold value Tn even when the upper limit value is reached, the carrier frequency may be corrected so that the new carrier frequency is lowered with respect to an initial value such as (1−α)×fc. Further, when a lower limit of the correction value is set, and if the phase current data is not less than the threshold value even when the lower limit value is reached, the frequency correction command generator 12 may generate an alarm.

An upper limit value and a lower limit value of a correction range of the carrier frequency are set to, for example, ±5% (±0.05) with the standard value (center frequency) as a reference. When the upper and lower limits are set in the correction range of the carrier frequency, it is possible to avoid decrease in efficiency of the power converter 7, increase in noise generation, or the like.

Next, processing related to a speed control of the embodiment will be described with reference to FIGS. 3A to 3E. FIGS. 3A to 3E are flowcharts of the processing related to a speed control of the first embodiment.

Figure 3A:
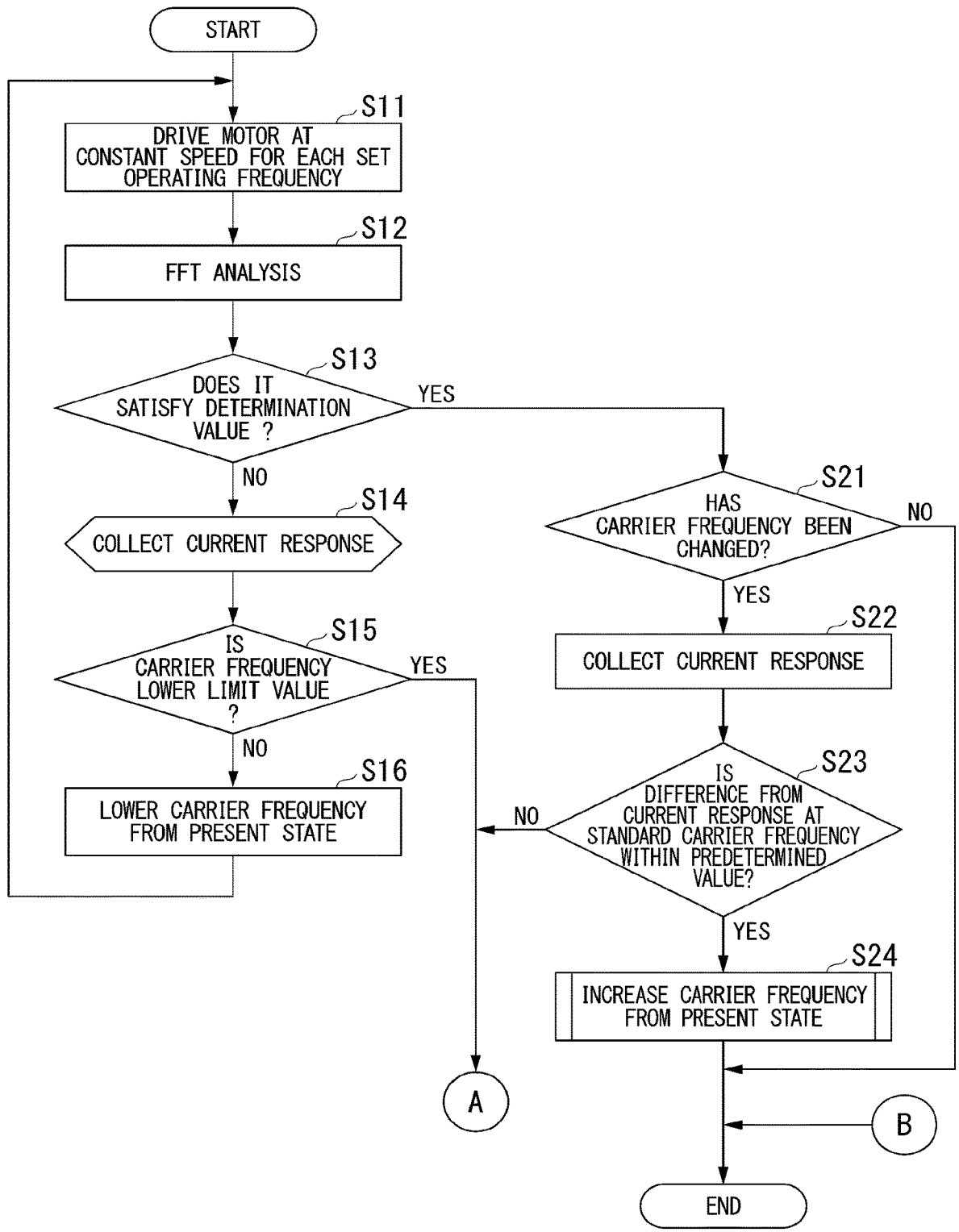
FIG. 3A is a flowchart of processing related to speed control of the first embodiment.

As illustrated in FIG. 3A, the motor speed control device 20 drives the motor at a constant speed for each frequency (set operating frequency) corresponding to a speed command value (step S11). Driving the motor at a constant speed refers to setting and controlling a constant target speed so that the speed is according to the speed command value.

The frequency calculator 9 performs calculation processing related to an FFT analysis (step S12) and adds data of a result of the FFT analysis to a storage device. The resonance determination unit 10 determines whether or not an amplitude level indicated by the result of the FFT analysis satisfies a determination value (step S13).

When the amplitude level indicated by the result of the FFT analysis in step S13 does not satisfy the determination value, the response characteristics determination unit 13 collects the current response (step S14), and may proceed to the processing of step S30 (FIG. 3B) when a result of collecting the current response is not satisfactory.

When the result of collecting the current response is satisfactory, the resonance determination unit 10 determines whether or not the carrier frequency fc is the lower limit value (step S15), and proceeds the processing to step S30 (FIG. 3B) when the carrier frequency fc is the lower limit value. On the other hand, when the carrier frequency fc is not the lower limit value, the frequency correction command generator 12 adjusts the correction amount to lower the carrier frequency from the present state (step S16), and then performs the processing from step S11.

When the amplitude level indicated by the result of the FFT analysis in step S13 satisfies the determination value, the resonance determination unit 10 determines whether or not the carrier frequency has been changed (step S21).

When the carrier frequency has been changed, the response characteristics determination unit 13 collects the current response (step S22).

The resonance determination unit 10 determines whether or not a difference between a current response at the present carrier frequency fc and a current response at the standard carrier frequency fc0 is within a predetermined value (step S23), and proceeds the processing to step S30 (FIG. 3B) when the difference from the current response at the standard carrier frequency fc0 is not within a predetermined value. On the other hand, when the difference from the current response at the standard carrier frequency fc0 in step S23 is within the predetermined value, the frequency correction command generator 12 adjusts the correction amount to increase the carrier frequency fc from the present state (step S24) and ends a series of the processing.

Here, a more specific example of the processing of adjusting the correction amount to increase the carrier frequency fc from the present state will be described with reference to FIG. 3C.

The frequency correction command generator 12 adjusts the correction amount to increase the frequency by a predetermined proportion of the frequency that has been changed previous time (step S241). For example, the above-described predetermined proportion may be set to (½) times. The motor speed control device 20 drives the motor at a constant speed for each set operating frequency (step S242). The frequency calculator 9 performs calculation processing related to the FFT analysis (step S243). The resonance determination unit 10 determines whether or not a size of each frequency component satisfies the determination value from the result of the FFT analysis in step S243 (step S244), and performs the processing from step S241 when the size of each frequency component satisfies the determination value. On the other hand, when the size of each frequency component does not satisfy the determination value, a series of the processing is ended.

Figure 3B:
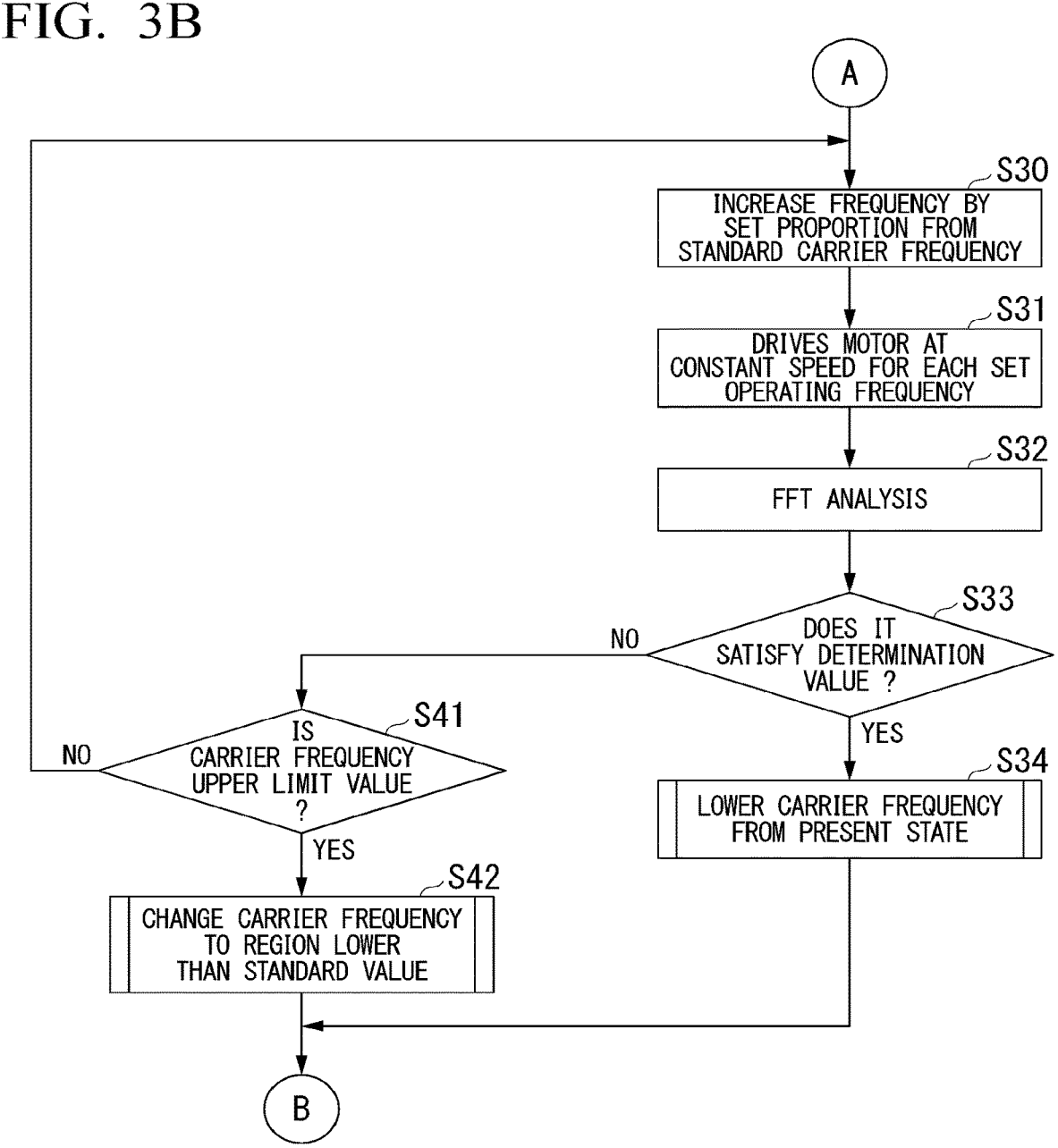
FIG. 3B is a flowchart of processing related to the speed control of the first embodiment.
Figure 3C:
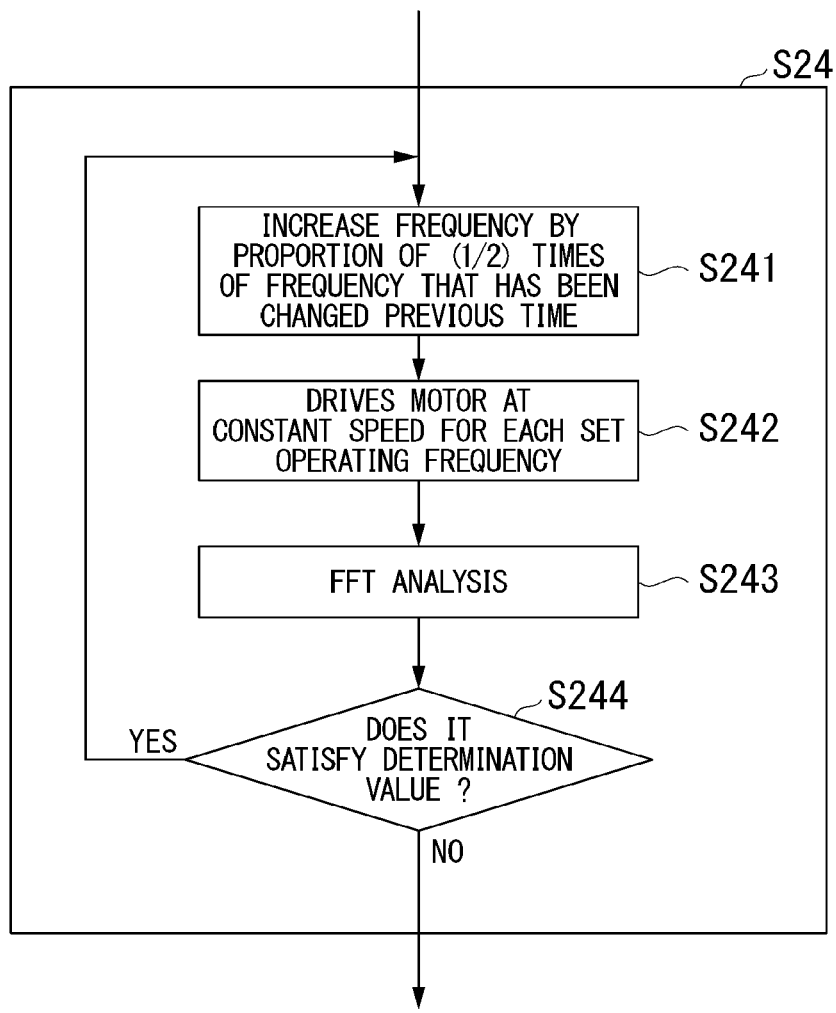
FIG. 3C is a flowchart of processing related to the speed control of the first embodiment.

The description of the processing related to the speed control will be continued with reference to FIG. 3B.

After the determination of step S15 and step S23 illustrated in FIG. 3A described above and step S41 to be described later, the frequency correction command generator 12 adjusts the correction amount to increase the frequency by a set proportion from the standard carrier frequency (step S30). The motor speed control device 20 drives the motor at a constant speed for each set operating frequency (step S31). The frequency calculator 9 performs calculation processing related to the FFT analysis (step S32). The resonance determination unit 10 determines whether or not the size of each frequency component satisfies the determination value from the result of the FFT analysis in step S32 (step S33), and proceeds the processing to step S41 when the size of each frequency component does not satisfy the determination value. On the other hand, as a result of the determination in step S33, when the size of each frequency component satisfies the determination value, the frequency correction command generator 12 adjusts the correction amount to lower the carrier frequency fc from the present state (step S34), and ends a series of the processing.

Figure 3D:
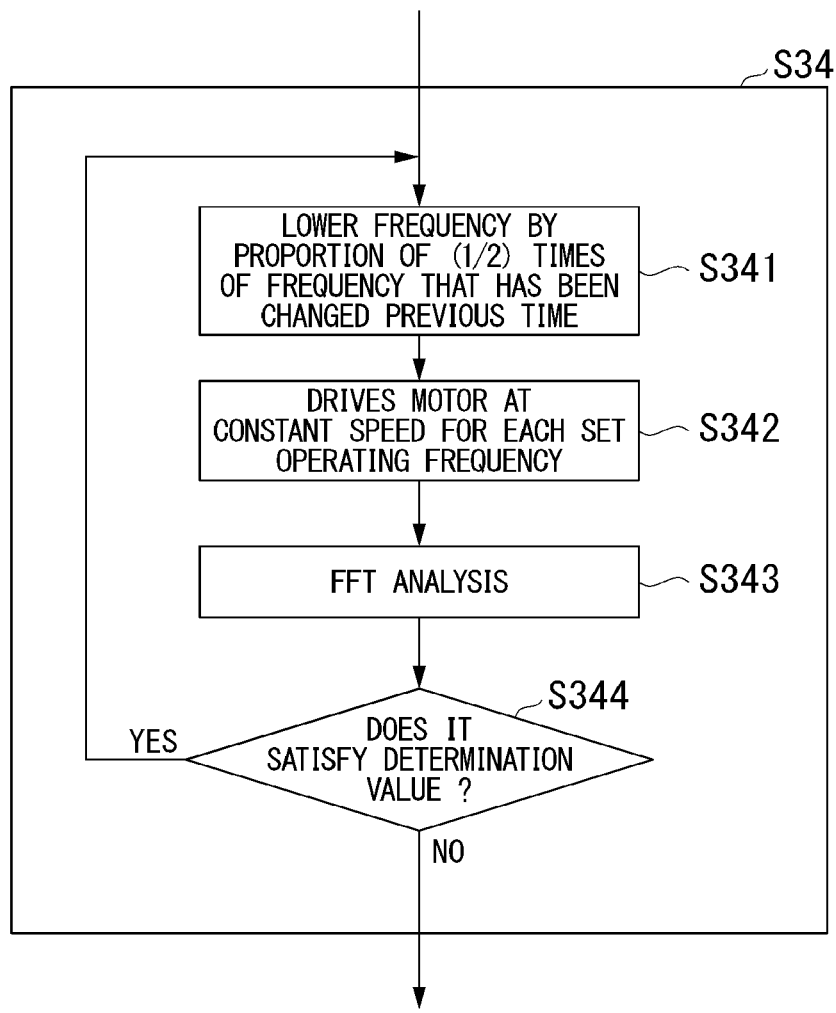
FIG. 3D is a flowchart of processing related to the speed control of the first embodiment.

Here, a more specific example of the processing of adjusting the correction amount to lower the carrier frequency fc from the present state will be described with reference to FIG. 3D.

The frequency correction command generator 12 adjusts the correction amount to lower the frequency by a predetermined proportion of the frequency that has been changed previous time (step S341). For example, the above-described predetermined proportion may be set to (½) times. The motor speed control device 20 drives the motor at a constant speed for each set operating frequency (step S342). The frequency calculator 9 performs calculation processing related to the FFT analysis (step S343). The resonance determination unit 10 determines whether or not the size of each frequency component satisfies the determination value from the result of the FFT analysis in step S343 (step S344), and performs the processing from step S341 when the size of each frequency component satisfies the determination value. On the other hand, when the size of each frequency component does not satisfy the determination value, a series of the processing is ended.

The description of the processing related to the speed control will be continued with reference to FIG. 3B.

After the determination in step S33, the resonance determination unit 10 determines whether or not the carrier frequency fc is the upper limit value (step S41), and proceeds the processing to step S30 when the carrier frequency fc is not the upper limit value. On the other hand, when the carrier frequency fc is the lower limit value, the frequency correction command generator 12 adjusts the correction amount to change the present carrier frequency to a region lower than the standard value (step S42), and ends a series of the processing depending on the conditions.

Figure 3E:
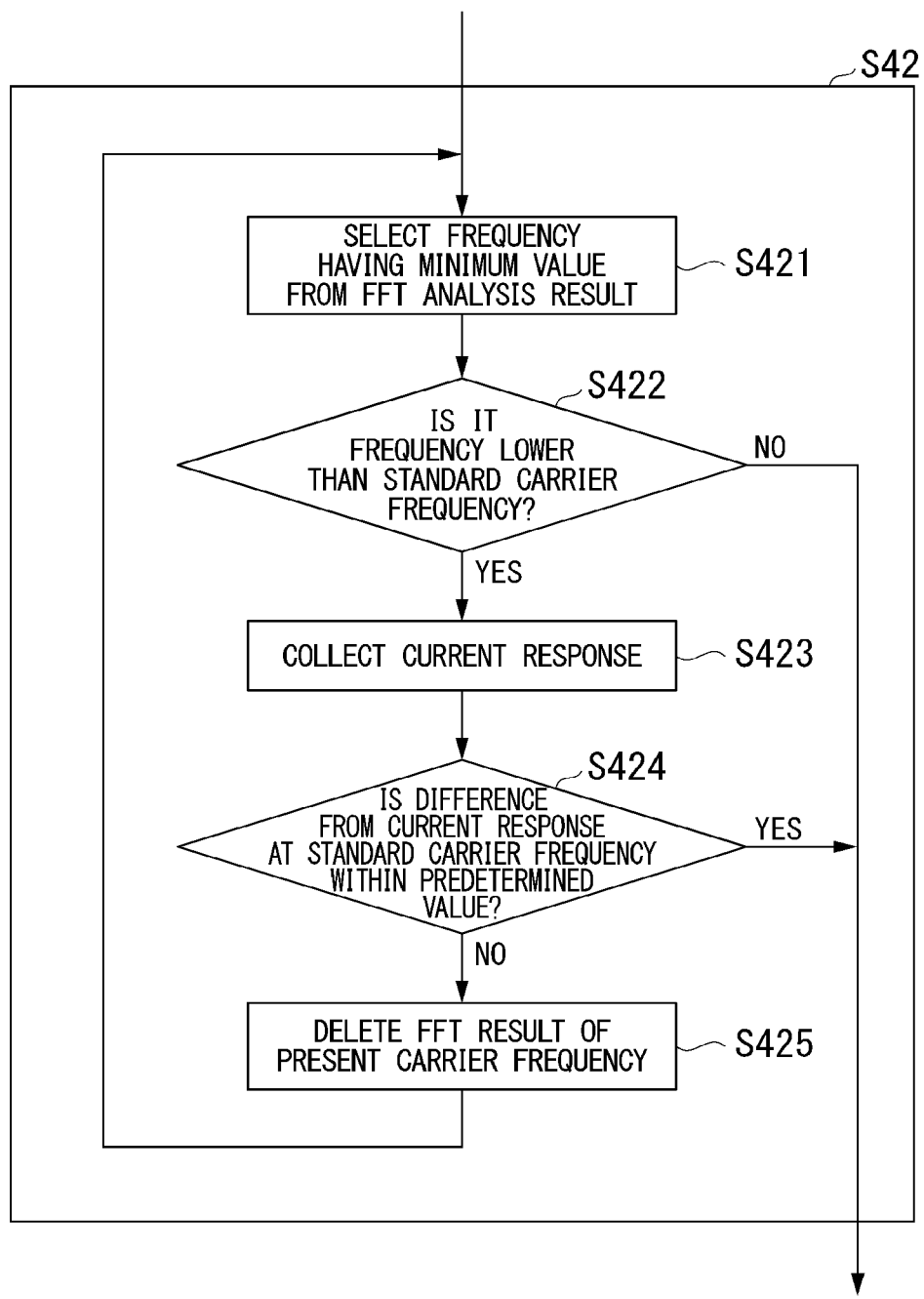
FIG. 3E is a flowchart of processing related to the speed control of the first embodiment.

Here, a more specific example of the processing of changing the present carrier frequency to a region lower than the standard value will be described with reference to FIG. 3E.

The resonance determination unit 10 selects a frequency (referred to as a selected frequency) whose component size has a minimum value among the frequencies from the FFT analysis result (step S421), and determines whether or not the selected frequency is a frequency lower than the standard carrier frequency (step S422). When the selected frequency is a frequency lower than the standard carrier frequency, the response characteristics determination unit 13 collects the current response (step S423). The resonance determination unit 10 determines whether or not a difference between a current response at the selected frequency and a current response at the standard carrier frequency is within a predetermined value (step S424). When the difference from the current response at the standard carrier frequency is not within the predetermined value, the frequency correction command generator 12 deletes the FFT result of the present carrier frequency fc (step S425) and sets the selected frequency as the new carrier frequency fc, and then proceeds the processing to step S421.

When the selected frequency is a frequency lower than the standard carrier frequency in the determination in step S422 described above and when the difference from the current response at the standard carrier frequency is within the predetermined value in the determination in step S424, a series of the processing is ended.

Effect of the motor drive system 1 of the present embodiment will be described.

Since the motor drive system 1 includes the power converter 7, the state detector, the frequency calculator 9, the frequency correction command generator 12, the drive amount limiter 11, and the speed controller 5, the motor drive system 1 can generate a current reference based on a speed command value and a rotor speed of the motor 2 according to the limitation based on predetermined conditions, and drive the motor 2 by the PWM control. At that time, the current transformer 7CT (state detector) detects a drive state of the motor 2. The frequency calculator 9 detects a size of a specific frequency component that fluctuates according to the drive state by using an index value indicating the drive state. The frequency correction command generator 12 generates a correction command of the carrier frequency used for the PWM control on the basis of a detected result of periodic fluctuation of the drive state. The drive amount limiter 11 limits a drive amount of the motor. When the carrier frequency is searched for in a direction in which it is increased, the drive amount limiter 11 adjusts an upper limit value of a size of the current caused to flow through the windings of the motor 2 in a direction in which the upper limit value is lowered from a predetermined upper limit current value. Thereby, generation of noise or vibration caused by driving the motor 2 can be suppressed.

Also, when the carrier frequency is searched for in a direction in which it is further lowered, the frequency correction command generator 12 may adjust the carrier frequency so that the response performance of the motor 2 falls within a range satisfying the predetermined reference. The range satisfying the predetermined reference described above may be determined on the basis of the response performance of the motor 2 as a reference. The response performance of the motor 2 may be defined on the basis of an amount of change in the rotor speed of the motor 2 with respect to an amount of change in the current reference.

A part of the motor drive system 1 may be realized by hardware such as, for example, a central processing unit (CPU) that expands a program stored in a storage device or sequentially reads and executes each step of the program. Some or all of the components described above are a part of the program executed by the CPU. For example, when an operation of the motor speed control device 20 is executed and realized by the CPU, a program of the vibration suppression control device 30 may be executed by the CPU of the motor speed control device 20.

The motor drive system 1 may be realized by a sequencer (referred to as a programmable logic controller (PLC)). The vibration suppression control device 30 may be realized as a part of a program of the PLC that supplies a speed command value to the motor speed control device 20, or may be realized by another PLC.

When the motor drive system 1 performs control as described above, a likelihood of causing a decrease in control accuracy that may occur by lowering the carrier frequency is eliminated. When the carrier frequency is made variable to avoid an operating speed of the motor 2 at which noise and vibration are generated, avoidance of the operating speed that needs to be avoided can be adjusted on the basis of control without human adjustment.

The motor drive system 1 may notify an external device of an occurrence status of a torque ripple related to the noise and vibration of the motor 2.

Due to a structure of a motor, there are cases in which resonance cannot be avoided even when the adjustment is attempted in a direction in which the carrier frequency is further lowered. Even in such a case, the motor drive system 1 can adjust the carrier frequency in a direction in which it is further increased and search for a carrier frequency that satisfies the conditions by the control described above.

Changing the carrier frequency affects the response performance of the control system. To avoid this, the motor drive system 1 may adjust operating parameters to appropriate values so that dynamic characteristics of the system can be maintained. When the operating parameters are adjusted, system stability and responsiveness may be set as conditions and the operating parameters may be set to satisfy them. As such an adjustment method, the present invention does not limit application of known methods or adaptive control on the basis of the carrier frequency, and an appropriate method may be selected.

Second Embodiment

A second embodiment will be described.

Parameters other than phase current data detected by the current transformer 7CT can be applied to data for determining presence or absence of resonance of the motor 2. For example, a case in which a size of an AC voltage is utilized as the above-described parameters will be exemplified in the second embodiment.

Figure 4:
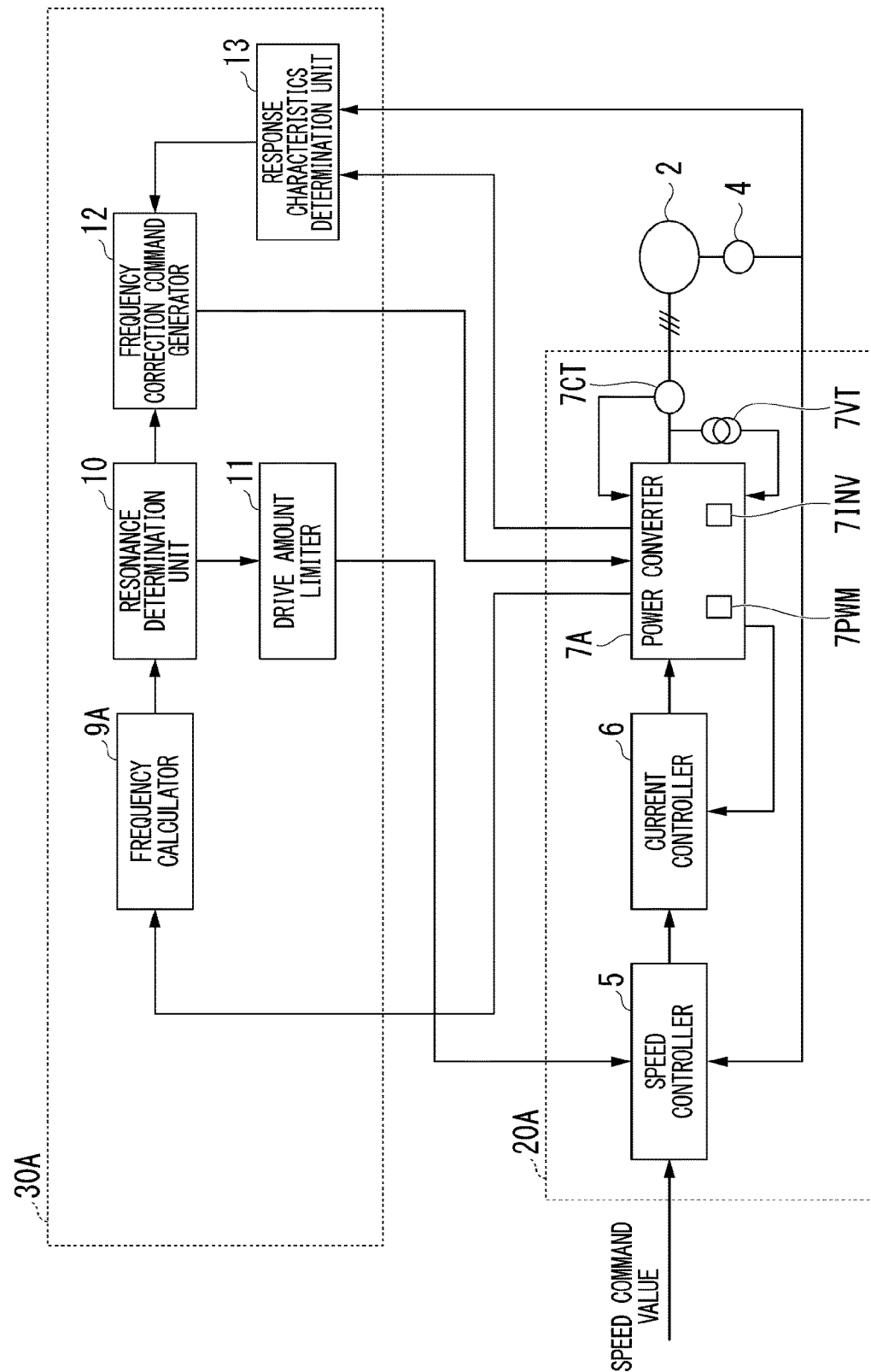
FIG. 4 is a block diagram illustrating a motor drive system according to a second embodiment.

FIG. 4 is a block diagram illustrating a motor drive system 1A according to the second embodiment.

As illustrated in FIG. 4, the motor drive system 1A of the second embodiment uses a detected value of a voltage detected by a voltage transformer 7VT instead of a detected value of the phase current detected by the current transformer 7CT.

A motor speed control device 20A and a vibration suppression control device 30A correspond to the above-described motor speed control device 20 and the vibration suppression control device 30.

The motor speed control device 20A includes a power converter 7A instead of the power converter 7 in the motor speed control device 20.

The voltage transformer 7VT for detecting each phase voltage is further provided in a wiring connected to an output of the power converter 7A. The voltage transformer 7VT detects a voltage (line voltage) between wirings of three-phase AC outputs. The power converter 7A acquires an instantaneous value of the line voltage detected by the voltage transformer 7VT and supplies it to the vibration suppression control device 30A. The voltage transformer 7VT and the power converter 7A are examples of state detectors. Further, the voltage transformer 7VT may detect a phase voltage instead of the line voltage.

The vibration suppression control device 30A determines whether or not resonance is being generated in the motor 2 on the basis of data of the instantaneous value of the supplied line voltage.

The vibration suppression control device 30A includes a frequency calculator 9A instead of the frequency calculator 9 of the vibration suppression control device 30.

The frequency calculator 9A is connected to the power converter 7A. The frequency calculator 9A converts the line voltage data in a time domain detected by the power converter 7A into data in a frequency domain.

The motor drive system 1A configured as described above can perform the speed control in the same procedure as the motor drive system 1 described above, and generation of noise or vibration caused by driving the motor 2 can be suppressed as in the first embodiment.

Third Embodiment

A third embodiment will be described.

In the third embodiment, a case in which sizes of an AC current and an AC voltage are utilized as the above-described parameters will be exemplified.

Figure 5:
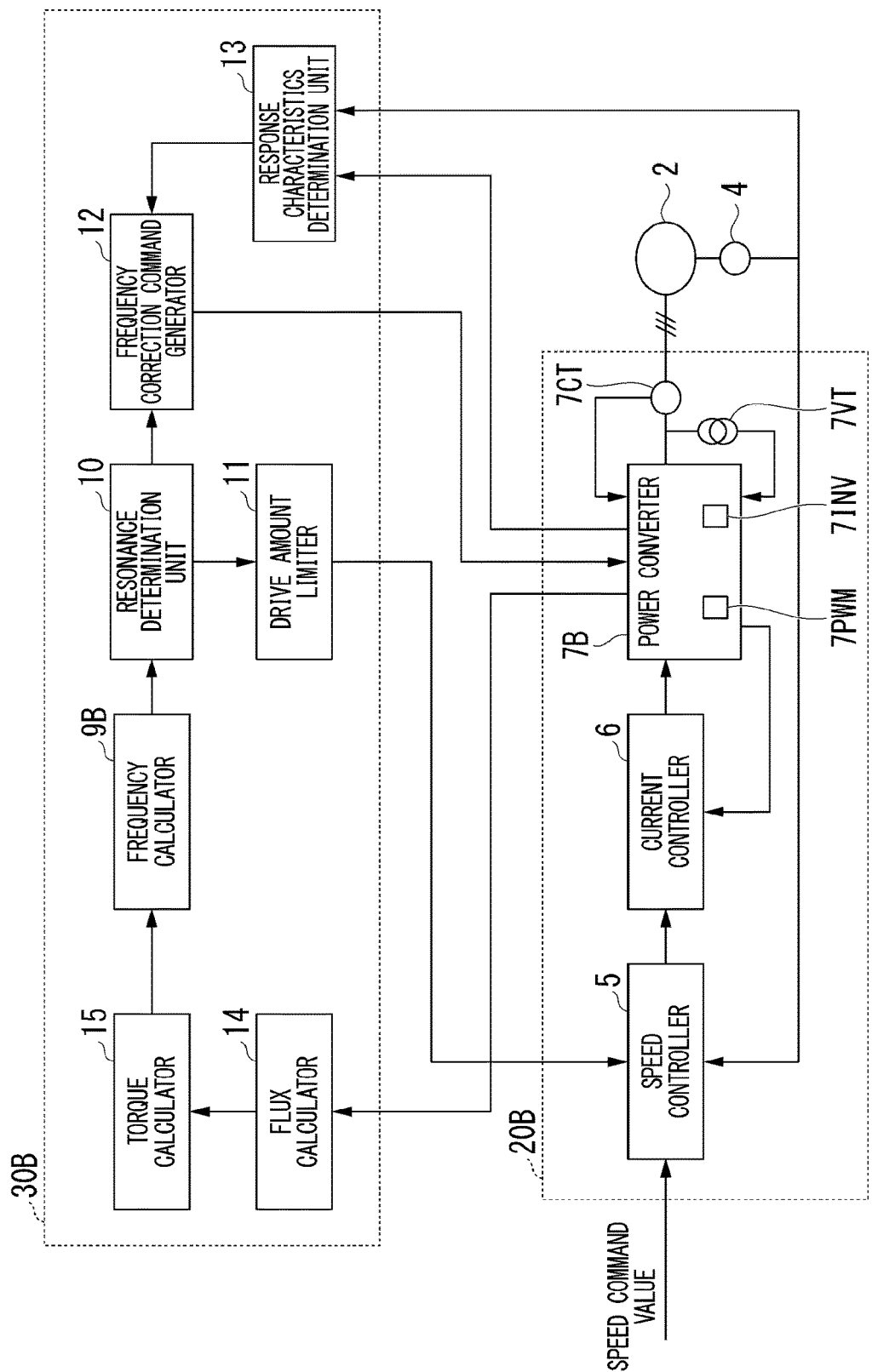
FIG. 5 is a block diagram illustrating a motor drive system according to a third embodiment.

FIG. 5 is a block diagram illustrating a motor drive system 1B according to the third embodiment.

As illustrated in FIG. 5, the motor drive system 1B of the second embodiment uses a detected value of a voltage detected by a voltage transformer 7VT in addition to a detected value of a phase current detected by the current transformer 7CT.

A motor speed control device 20B and a vibration suppression control device 30B correspond to the above-described motor speed control device 20 and the vibration suppression control device 30.

The motor speed control device 20B includes a power converter 7B instead of the power converter 7 in the motor speed control device 20.

The voltage transformer 7VT for detecting each phase voltage is further provided in a wiring connected to an output of the power converter 7B. The power converter 7B further acquires an instantaneous value of a line voltage detected by the voltage transformer 7VT, combines this with an instantaneous value of a phase current detected by the current transformer 7CT, and supplies them to the vibration suppression control device 30B. The current transformer 7CT, the voltage transformer 7VT, and the converter 7A are examples of state detectors.

The vibration suppression control device 30B determines whether or not resonance is being generated in a motor 2 on the basis of data of the instantaneous value of the supplied phase current and the instantaneous value of the supplied line voltage.

The vibration suppression control device 30B includes a frequency calculator 9B instead of the frequency calculator 9 of the vibration suppression control device 30, and further includes a magnetic flux calculator 14 and a torque calculator 15.

The magnetic flux calculator 14 is connected to the power converter 7. The magnetic flux calculator 14 acquires voltage and current data output by the power converter 7B from the power converter 7B. For example, this voltage is a voltage based on the line voltage detected by the voltage transformer 7VT. This current is a current based on the phase current detected by the current transformer 7CT. The magnetic flux calculator 14 calculates a magnetic flux on the basis of the voltage and current data output by the power converter 7B and a resistance value in the windings of the motor 2. The resistance value in the windings of the motor 2 is set in advance by actual measurement or the like.

The torque calculator 15 is connected to an output of the magnetic flux calculator 14. The torque calculator 15 calculates a value of a shaft torque on the basis of a value of the magnetic flux calculated by the magnetic flux calculator 14. The calculated value of the shaft torque is supplied to the frequency calculator 9B. A ripple due to resonance (torque ripple) is included in the calculated value of the torque.

Thereby, a speed control can be performed in the same procedure as the motor drive system 1 described above, and generation of noise or vibration caused by driving the motor 2 can be suppressed as in the first embodiment.

First Modified Example of Third Embodiment

Although a case of using an estimated torque value has been described in the third embodiment described above, instead of this, a detected value of a torque detected using a shaft torque detector may be used in a first modified example. A ripple (torque ripple) due to resonance is included in the above-described detected value of the torque. Similar processing can be applied also using the detected value of the torque.

Second Modified Example of Third Embodiment

Although a case of using an estimated torque value has been described in the third embodiment described above, instead of this, a value of power based on the above-described voltage and current may be used in a second modified example. A ripple (power ripple) due to resonance is included in the calculated value of power. Similar processing can be applied also using the value of power.

According to at least one embodiment described above, the motor drive system includes the power converter, the state detector, the frequency calculator, the frequency correction command generator, the drive amount limiter, and the speed controller. The power converter drives the motor by PWM control. The state detector detects a drive state of the motor. The frequency calculator detects a size of a specific frequency component that fluctuates according to the drive state by using an index value indicating the drive state. The frequency correction command generator generates a correction command of a carrier frequency used for the PWM control on the basis of a detected result of periodic fluctuation of the drive state. The drive amount limiter limits a drive amount of the motor. When the carrier frequency is searched for in a direction in which it is increased, the drive amount limiter adjusts an upper limit value of a size of a current caused to flow through windings of the motor in a direction in which the upper limit value is lowered from a predetermined upper limit current value. The speed controller generates a current reference based on a speed command value and a rotor speed of the motor according to the limitation. According to this, it is possible to realize a motor drive system and a motor drive method in which generation of noise or vibration caused by driving the motor is suppressed While preferred embodiments of the present invention have been described, it should be understood that these embodiments are exemplary of the invention and are not to be considered as limiting the scope of the invention. These novel embodiments can be implemented in many other different forms, and various omissions, substitutions, and modifications can be made within a range not departing from the gist of the invention. The embodiments and modifications thereof should be regarded as being included within the scope and gist of the invention and included in the invention described in the claims and an equivalent scope thereof. Also, the embodiments described above can be implemented in combination with each other.

REFERENCE SIGNS LIST 1, 1A, 1B Motor drive system
2 Motor
4 Speed detector
5 Speed controller
6 Current controller
7, 7A, 7B Power converter
7CT Current transformer
7VT Voltage transformer
9, 9A, 9B Frequency calculator
10 Resonance determination unit
11 Drive amount limiter
12 Frequency correction command generator
13 Response characteristics determination unit
14 Magnetic flux calculator
15 Torque calculator
20, 20A, 20B Motor speed control device
30, 30A, 30B Vibration suppression control device

The invention claimed is:

1. A motor drive system comprising:
a power converter driving a motor by PWM control;
a state detector detecting a drive state of the motor;
a frequency calculator detecting a size of a specific frequency component which fluctuates according to the drive state by using an index value indicating the drive state;
a frequency correction command generator generating a correction command of a carrier frequency used for the PWM control on the basis of a detected result of periodic fluctuation of the drive state;
a drive amount limiter limiting a drive amount of the motor; and
a speed controller generating a current reference based on a speed command value and a rotor speed of the motor according to the limitation, wherein
the drive amount limiter adjusts an upper limit value of a size of a current caused to flow through windings of the motor in a direction in which the upper limit value is lowered from a predetermined upper limit current value when the carrier frequency is searched for in a direction in which the carrier frequency is increased.

2. The motor drive system according to claim 1, wherein the frequency correction command generator adjusts the carrier frequency so that a response performance of the motor falls within a range satisfying a predetermined reference when the carrier frequency is searched for in a direction in which the carrier frequency is further lowered.

3. The motor drive system according to claim 2, wherein the range satisfying the predetermined reference is determined on the basis of the response performance of the motor as a reference.

4. The motor drive system according to claim 1, wherein the response performance of the motor is defined on the basis of an amount of change in the rotor speed of the motor with respect to an amount of change in the current reference.

5. A motor drive method which is a motor drive method driving a motor by PWM control, comprising:
detecting a drive state of the motor;
detecting a size of a specific frequency component which fluctuates according to the drive state by using an index value indicating the drive state;
generating a correction command of a carrier frequency used for the PWM control on the basis of a detected result of periodic fluctuation of the drive state;
a process of limiting a drive amount of the motor; and
a process of adjusting an upper limit value of a size of a current caused to flow through windings of the motor in a direction in which the upper limit value is lowered from a predetermined upper limit current value when the carrier frequency is searched for in a direction in which the carrier frequency is increased.

* * * * *